May 16, 1961   H. W. JENSEN ET AL   2,984,437
AIRCRAFT LANDING GEAR

Filed Aug. 27, 1957   3 Sheets-Sheet 1

INVENTORS
ERWIN H. HARTEL
HARVEY W. JENSEN
BY
ATTORNEY

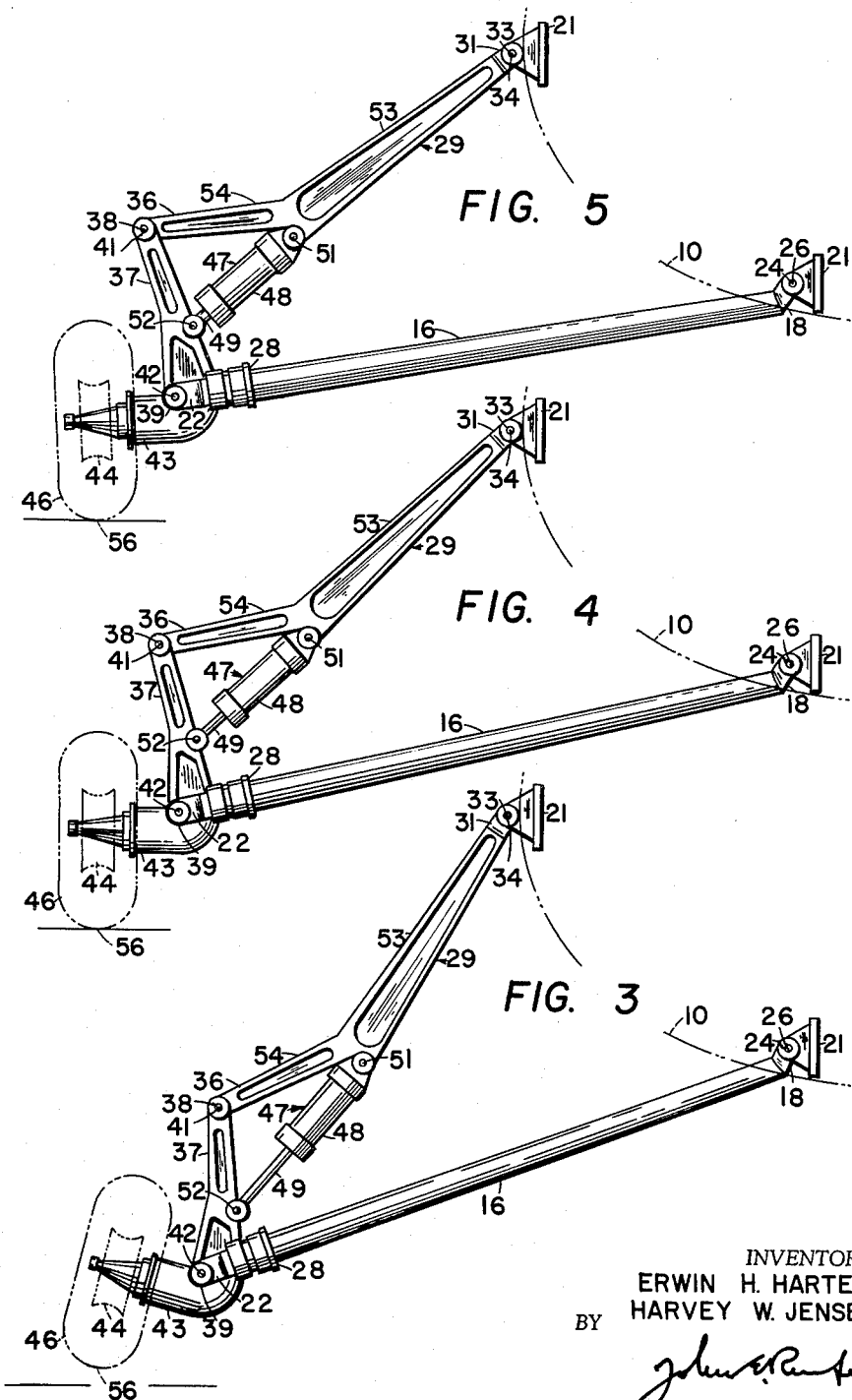

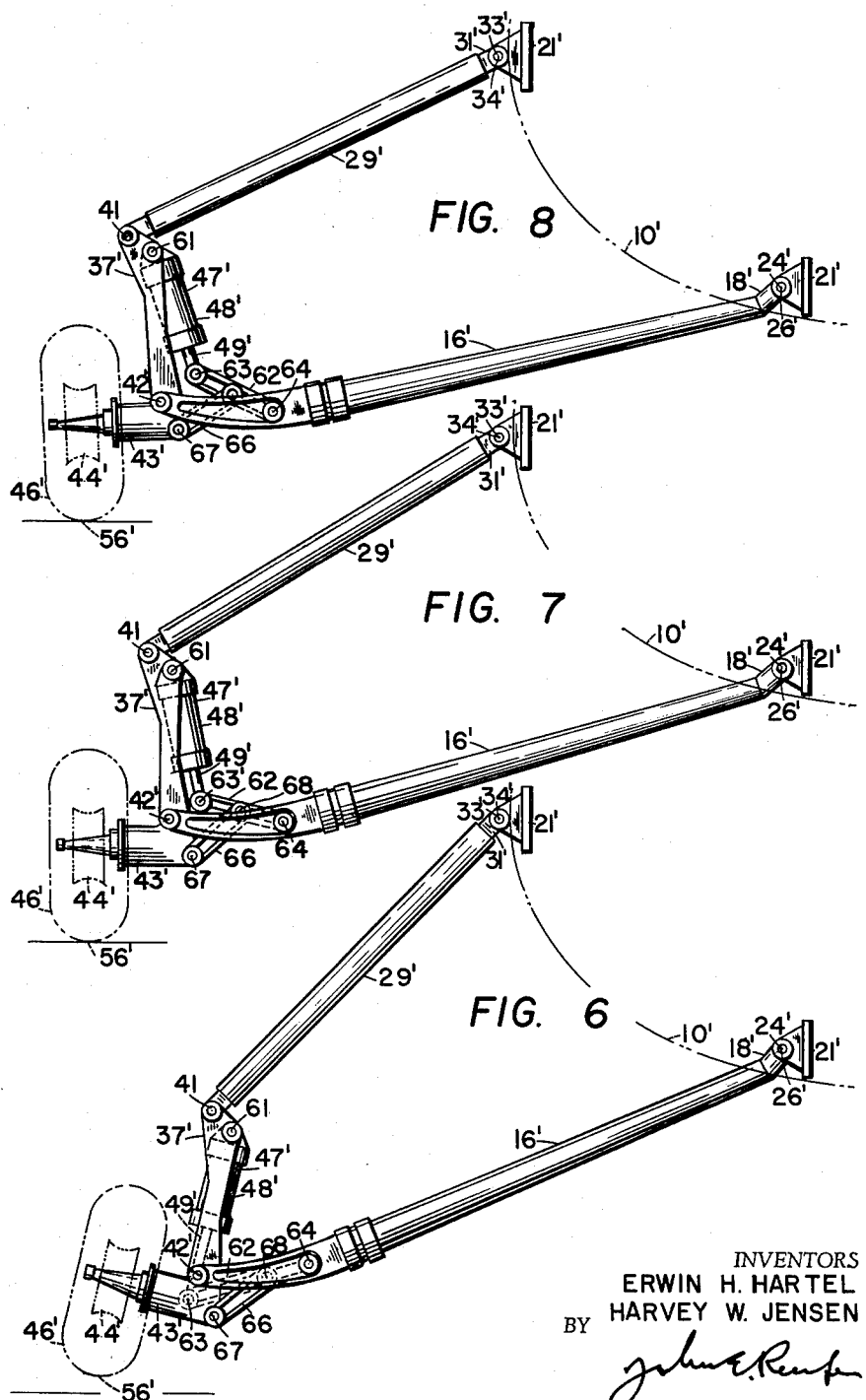

United States Patent Office 2,984,437
Patented May 16, 1961

2,984,437
AIRCRAFT LANDING GEAR

Harvey W. Jensen, Parma, and Erwin H. Hartel, Cleveland, Ohio, assignors to Cleveland Pneumatic Industries, Inc., Cleveland, Ohio, a corporation of Ohio Filed Aug. 27, 1957, Ser. No. 680,588

6 Claims. (Cl. 244—104)

This invention relates generally to landing gears and more particularly to a non-scuffing laterally extending landing gear adapted to be mounted on an aircraft fuselage. The invention disclosed and claimed herein is a modification of the invention covered in the United States patent application of Erwin H. Hartel, Serial Number 680,569 filed August 27, 1957, now Patent Number 2,926,948 and solves a similar landing gear problem.

In certain types of aircraft, such as helicopters and the like or very high speed aircraft with very thin wings, it is necessary to use landing gears which are mounted on the fuselage and extend laterally therefrom to provide sufficient wheel tread. In such a structure the strut is inclined downwardly away from the fuselage and any movement of the free or outer end of the strut produces lateral movement of the landing wheel and results in side scuffing of the tire, unless means are provided to eliminate the lateral motion. The problem is particularly troublesome on helicopters wherein rotor rotation produces rather severe vertical vibrations of the aircraft which vertical vibrations tend to introduce lateral scuffing of the landing wheels.

It is an important object of this invention to provide a laterally extending landing gear for aircraft with spring and shock absorbing means adapted to absorb landing impacts and resiliently support the aircraft on the ground without introducing lateral scuffing between the landing wheels and the ground.

It is still another object of this invention to provide an aircraft landing gear adapted to be mounted on the fuselage of the aircraft wherein the wheels tip during the stroking of the landing gear to eliminate side scuffing of the tires.

Further objects and advantages will appear from the following description and drawings, wherein:

Figure 3 is a front view of the landing gear showing the position of the elements when the landing gear is in the extended position prior to landing;

Figure 4 is a view similar to Figure 3 showing the positions the elements assume when the landing gear is in the static position;

Figure 5 is a view similar to Figures 3 and 4 showing the positions of the elements in the fully compressed position;

Figure 6 is a front view of a second embodiment of landing gears according to this invention with the elements in the extended position;

Figure 7 is a view similar to Figure 6 with the elements in a static position; and Figure 8 is a view similar to Figures 6 and 7 showing the elements in the fully compressed position.

Figure 1:
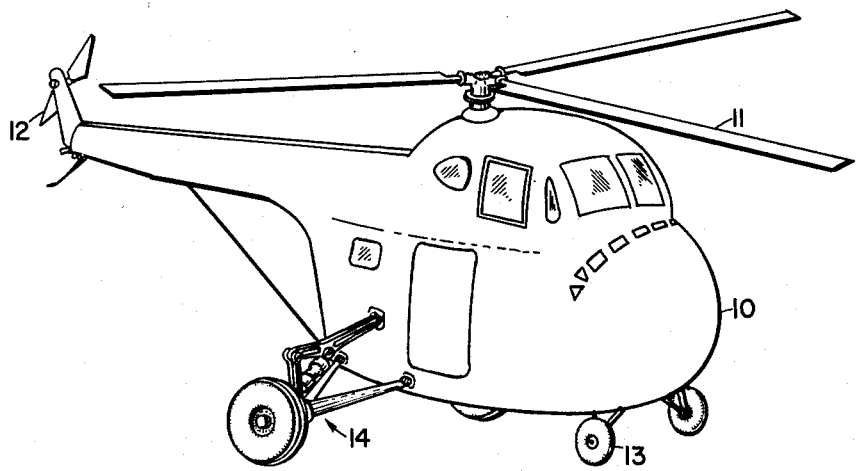
Figure 1 is a perspective view of a typical helicopter with a landing gear according to this invention mounted therein.
Figure 2:
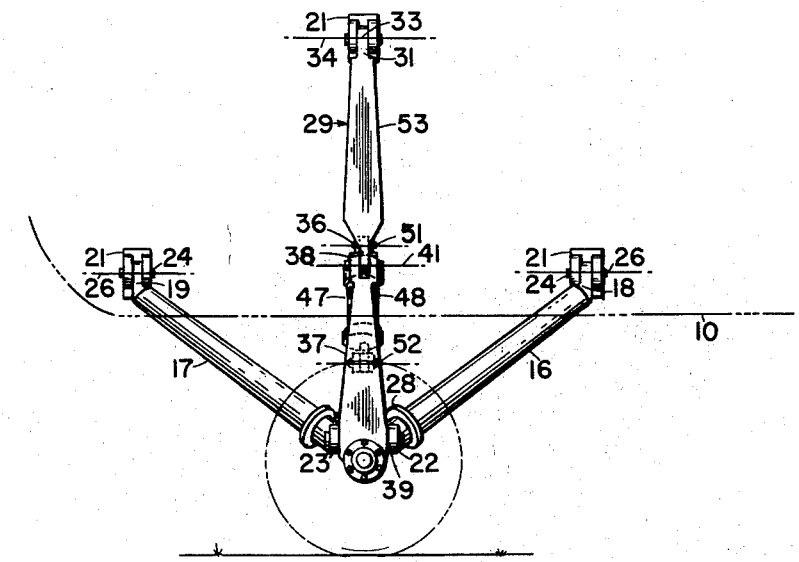
Figure 2 is an enlarged fragmentary side view of the main landing gear shown in Figure 1.

In Figure 1 a preferred landing gear according to this invention is shown as it could be used in combination with a helicopter having a fuselage 10, a main rotor 11, and an anti-torque tail rotor 12. The helicopter itself forms no part of this invention except insofar as it cooperates with the preferred landing gear and is merely shown as one of the types of aircraft in which the landing gear is mounted on the aircraft fuselage. The helicopter is supported on the ground by a pair of castering nose wheels 13 and a pair of main landing gears 14 incorporating this invention.

Referring to Figures 2 through 5, the first embodiment of the landing gear includes a pair of lower struts 16 and 17, each connected by pivots 24 at their inner ends 18 and 19 on the frame of the aircraft schematically shown at 21 for rotation about a single pivot axis 26. The two lower strut members 16 and 17 extend laterally and downwardly away from the fuselage 10 and converged toward the outer ends 22 and 23 respectively. The two struts 16 and 17 are connected at their outer ends 22 and 23 so the two struts function as a unitary member and the two are used rather than a single member to provide a structure wherein the two pivots 24 are spaced from each other along the fuselage 10 to provide sufficient strength to resist loads aligned with the main axis of the fuselage.

An upper strut 29 is pivotally connected at its inner end 31 to the frame 21 by a pivotal connection 33 for motion around an axis 34 spaced above the axis 26 and parallel relative thereto. The upper strut 29 extends in a converging manner relative to the struts 16 and 17 to an outer end 36 spaced above the outer ends 22 and 23 of the struts 16 and 17. A wheel support 37 is pivotally connected to the outer end 36 of the upper strut 29 by a pivot connection 38 and to the outer ends 22 and 23 of the struts 16 and 17 by a pivotal connection 39. The pivotal connections 38 and 39 permit relative rotation between the wheel support 37 and the associated strut 29 and the struts 16 and 17 around pivot axes 41 and 42 respectively, which axes are both parallel to the axes 26 and 34. The wheel support 37 is also formed with an axle 43 which extends laterally from the lower end of the wheel support on which is journaled a landing wheel 44 and tire 46.

Referring to Figures 3 through 5 upward movement of the wheel support 37 causes the lower struts 16 and 17 to rotate around the pivot axis 26 and the upper strut 29 to rotate around its pivot axis 34. This is apparent by comparing the positions of the elements in these three figures. Such movement also produces pivotal movement between the wheel support 37 and the lower struts 16 and 17 around the pivot axis 42 and pivotal movement of the wheel support 37 relative to the upper strut 29 around the pivot axis 41.

A fluid spring 47 formed with a cylinder 48 and a telescoping piston 49 is provided to resiliently resist upward movement of the tire 46 and wheel support 37 relative to the frame 10 of the aircraft. The cylinder 48 is connected by a pivot 51 to an intermediate point on the upper strut 29 and the piston 49 is pivotally connected by a pivotal connection 52 to an intermediate point on the wheel support 37. The fluid spring 47 functions in the normal way to provide a force urging the piston 49 downwardly relative to the cylinder 48 and, therefore, produces a downward force on the pivotal connection 52 and an upward force on the pivotal connection 51. Any suitable type of spring can be used, however, it is preferable to use a liquid spring, since such springs are capable of exerting large forces and have relatively short strokes and are relatively light weight.

The upper strut 29 should be provided with a compression section 53, which extends directly between the inner end 31 and the pivotal connection 51 and torsion section 54 which extends between the pivotal connection 51 and the outer end 36. To minimize the bending stresses in the upper strut 29 the various elements should be arranged so that the compression section 53 is substantially aligned with the fluid spring 47 when the elements are in the static position of Figure 4.

Referring now to Figure 3. When the elements are in the fully extended position of this figure, the piston 49 is extended relative to the cylinder 48 and the wheel support is at its lower most position. If a force is applied to the tire 46 by engagement of the bottom portion 56 with the ground the wheel support 37 will move upwardly relative to the fuselage 10 of the aircraft. This causes movement of the elements toward the position of Figure 4 and produces rotation of the wheel support 37 relative to the upper strut 29 in a counterclockwise direction. Such relative rotation brings the pivot connections 51 and 52 closer together and compresses the spring 47. If the wheel support 37 continues to move upwardly to the fully compressed position of Figure 5, continued compression of the spring 47 takes place. Because the spring 47 is compressed by upward movement of the wheel support 37, such upward movement is resisted by the spring 47 so the tire 46 is resiliently urged downwardly relative to the fuselage 10 and can, therefore, resiliently support the weight of the aircraft when it is on the ground. Again comparing Figures 3, 4, and 5 it is apparent that the pivotal connection 39 moves along an arc having a center at the pivot axis 26 and that pivotal connection 38 moves along an arc having a center at the axis 34. Since all of the struts extend downwardly away from the fuselage 10 upward movement of the piovtal connections 38 and 39 is inclined relative to the vertical and produces horizontal movement of the pivots 38 and 39 away from the fuselage 10. Such horizontal movement if not compensated for, would produce lateral scuffing of the tire 46 and result in excessive wear.

It should be noted, however, that the wheel support 37 rotates in a counterclockwise direction relative to the pivotal connection 39 as it moves upwardly relative to the fuselage 10. This produces counter-clockwise rotation of the wheel 44 and the tire 46.

The various elements are arranged so that the bottom portion 56 is below the outer end 22 so it moves relative to the lower struts 16 and 17, due to this counter-clockwise rotation of the wheel support 37 and the tire 46, along an arc having its center at the pivotal connection 39 in a manner so that the movement of the bottom portion relative to the pivotal connection 39 has a horizontal component of movement in a direction toward the fuselage 10. These two horizontal components of movement of the pivot 39 relative to the fuselage 10 and of the bottom portion 56 relative to the pivot 39 subtract from each other and if the elements are properly proportioned, as illustrated, there is no horizontal movement of the bottom portion 56 relative to the fuselage 10, as the wheel support 37 is moved upwardly relative to the fuselage 10. In other words, the pivotal connection 39 moves horizontally away from the fuselage 10 during the compression of the landing gear and simultaneously the bottom portion 56 moves relative to the pivotal connection 39 toward the fuselage 10. The two horizontal components of movement are arranged so that they are equal in magnitude and opposite in direction so there is no horizontal movement of the bottom portion 56 relative to the fuselage 10 and therefor no scuffing of the tire 46 on the ground.

The elements should be arranged so that the wheel 44 is vertical when the elements are in the static position of Figure 4 to minimize on any lateral loadings of the tire 46. Because loads can only be applied to the two lower struts 16 and 17 at their ends through pivotal connections these struts are subjected to only tension and compression loads so a cylindrical type strut is the lightest for any given strength. However, loads are applied to the upper strut 29 at two ends and at the pivotal connection 51 so bending moments are applied to this strut. This strut is therefor formed with an "I" shaped cross section so that it will have the maximum strength for a given strut weight to resist the bending moments.

In the embodiment shown in Figures 6 through 8 a similar geometry is used to eliminate the tire scuffing. However, the fluid spring arrangement is changed so that the fluid spring extends substantially along a line connecting the outer ends in the profile of the support and the bending motion is applied to the lower struts. This is done to improve the aero-dynamics of the landing gear and reduce its drag when the aircraft is airborne by substantially enclosing the fluid spring within the profile of the wheel support member. In his embodiment similar reference numerals are utilized to designate elements having similar functions except that a prime will be added to indicate the second embodiment. Here again the lower strut 16' is pivoted on the frame 21' of the fuselage 10' for motion around a pivot axis 26'. In Figures 6 through 8 only the lower strut 16' appears but a similar lower strut corresponding to the lower strut 17 is utilized and is located behind the lower strut 16'. The upper strut 29' is pivotally connected to the frame 21' for rotation around a pivot axis 34' and the wheel support 37' is pivotally connected to the upper strut 29' for rotation relative thereto around a pivot axis 41' and to the lower strut 16' for rotation relative thereto around a pivot axis 42'. The wheel support 37' is again formed with an axle 43' on which is mounted a wheel 44' and a tire 46'. The relationship between the pivots is the same as in the first embodiment so upward movement of the wheel support 37' produces vertical movement of the bottom portion 56' of the tire without lateral scuffing. The principle difference between this embodiment and the first embodiment is in the mounting of the fluid spring 47'. In this case the cylinder 48' is connected to the wheel support 37' by a pivot 61 and the piston 49' is pivotally connected to a link 62 at 63 and the link 62 is pivotally connected to the lower strut 16' at 64. A second link 66 is pivotally connected to the wheel support 37' at 67 and to the link 62 at 68. This linkage is arranged to multiply the movement between the points 67 and the lower strut 16' when the wheel support 37' rotates around the pivot axis 42' in a counter-clockwise direction so that a satisfactory stroke will be provided for this fluid spring 47'.

By comparing Figure 6 with Figures 7 and 8 it can be seen that as the wheel support 37' moves upwardly relative to the fuselage 10' it also rotates in a counter-clockwise direction relative to the lower strut 16'. This counter-clockwise rotation between the wheel support 37' and the lower strut 16', through the connection of the link 66, produces clockwise rotation of the link 62 relative to the lower strut 16' around the pivot 64. This in turn causes compression of the spring 47' so that the spring can support the weight of the aircraft on the ground.

In the second embodiment the upper strut 29' is subjected only to compression and tenson loads and the bending loads are transmitted through the lower struts. However, the action of the landing gear is identical to that shown in the first embodiment. In both embodiments lateral wheel scuffing is eliminated in the zone of engagement because the ground and the tire do not move laterally as a landing gear moves between the extended and compressed positions.

Although the preferred embodiments of this invention are illustrated, it will be realized that various modifications of the structural details may be made without departing from the mode of operation and the essence of the invention. Therefore, except insofar as they are claimed in the appended claims, structural details may be varied widely without modifying the mode of opera-

We claim:

1. A landing gear for supporting an aircraft on the ground comprising an aircraft frame, a lower elongated strut having an inner end pivoted on said frame extending to an outer end laterally spaced from and below its inner end, an upper elongated strut having an inner end pivoted on said frame and extending to an outer end converging toward said lower strut outer end, a support pivotally connected at spaced points to said outer ends, an element mounted on said support having a bottom portion below said lower strut outer end engageable with the ground, and spring means operatively connected between said support and one of said struts applying a force to one of said struts which produces a force moment urging the outer end of said one strut downwardly relative to its inner end, a vertical force applied to said bottom portion producing movement of said lower strut outer end along a first inclined locus increasing the horizontal spacing between said lower strut outer end and said frame and rotation of said bottom portion relative to said lower strut outer end along a second inclined locus reducing the horizontal spacing therebetween thereby maintaining the horizontal spacing between said bottom portion and frame substantially constant.

2. In combination an aircraft fuselage, a lower strut pivotally connected at its inner end to said fuselage for motion around a first axis and extending laterally and downwardly to an outer end, an upper strut pivotally connected at its inner end to said fuselage for rotation relative thereto about a second axis and extending to an outer end converging toward said outer end of said lower strut, a support pivotally connected to said outer end of said lower strut for rotation relative thereto about a third axis and to said outer end of said upper strut for rotation relative thereto about a fourth axis, all of said axes being parallel, a ground engaging wheel journaled on said support, a fluid spring having piston and cylinder members axially movable relative to each other, means operatively connecting one of said members to one of said struts and the other of said members to said support, said spring producing a force on said support tending to urge said third axis away from said second axis.

3. A landing gear for supporting an aircraft on the ground comprising an aircraft frame, a lower elongated strut having an inner end pivoted on said frame extending to an outer end laterally spaced from and below its inner end, an upper elongated strut having an inner end pivoted on said frame and extending to an outer end converging toward said lower strut outer end, a support pivotally connected at spaced points to said outer ends, an element mounted on said support having a bottom portion below said lower strut outer end engageable with the ground, a fluid spring including piston and cylinder members axially movable relative to each other, pivot means connecting one of said members to said upper strut at an intermediate point thereon and the other of said members to said support, the axis of said fluid spring being substantially aligned with a line through said intermediate point and said upper strut inner end when the aircraft is supported by said element on the ground, said fluid spring producing a force moment in said upper strut urging the outer end thereof downwardly relative to its inner end.

4. In combination an aircraft fuselage, a lower strut element pivotally connected at its inner end to said fuselage and extending laterally and downwardly to an outer end, an upper strut element pivotally connected at its inner end to said fuselage and extending to an outer end converging toward said lower strut element outer end, a support element pivotally connected to said lower strut element outer end and to said upper strut element outer end, a ground engaging wheel journaled on said support element, a fluid spring having piston and cylinder members axially movable relative to each other, linkage means connected at one point to said support element and at a second point to one of said strut elements, pivot means connecting one of said members to one of said elements and the other of said members to said linkage means, said linkage means operating under the influence of relative movement between said points due to relative rotation between said support element and said one strut element effecting axial movement between said piston and cylinder members, said fluid spring through the connections of said linkage means producing a force moment in said one strut element urging the outer end thereof downwardly relative to its inner end.

5. In combination an aircraft fuselage, a lower strut element pivotally connected at its inner end to said fuselage and extending laterally and downwardly to an outer end, an upper strut element pivotally connected at its inner end to said fuselage and extending to an outer end converging toward said lower strut element outer end, a support element pivotally connected to said lower strut element outer end and to said upper strut element outer end, a ground engaging wheel journaled on said support element, a cylinder extending substantially along a line connecting said outer ends, a piston member co-operating with said cylinder to form a fluid spring member axially movable relative to said cylinder member, linkage means connected at one point to said support element and at a second point to one of said strut elements, pivot means connecting one of said members to one of said elements and the other of said members to said linkage means, said linkage means operating under the influence of relative movement between said points due to relative rotation between said support element and said one strut element effecting axial movement between said piston and cylinder members, said fluid spring through the connection of said linkage means producing a force moment in said one strut element urging the outer end thereof downwardly relative to its inner end.

6. In combination an aircraft fuselage, a lower strut pivotally connected at its inner end to said fuselage and extending laterally and downwardly to an outer end, an upper strut pivotally connected at its inner end to said fuselage and extending to an outer end converging toward said lower strut outer end, a support pivotally connected to said lower strut outer end and to said upper strut outer end, a ground engaging wheel journaled on said support, a fluid spring having piston and cylinder members axially movable relative to each other, motion amplifying linkage means connected at one point to said support and at a second point to said lower strut, pivot means connecting one of said members to said support and the other of said members to said linkage means, said linkage means operating under the influence of relative movement of one magnitude between said points due to relative rotation between said support and said lower strut effecting axial movement of a greater magnitude between said piston and cylinder members, said fluid spring through the connection of said linkage means producing a force moment in said lower strut urging the outer end thereof downwardly relative to its inner end.

References Cited in the file of this patent

UNITED STATES PATENTS

| 1,955,142 | Minshall | Apr. 17, 1934 |
| 2,347,959 | Moore | May 2, 1944 |
| 2,431,302 | Bachman | Nov. 25, 1947 |
| 2,777,652 | Grudin | Jan. 15, 1957 |

FOREIGN PATENTS

| 712,774 | Germany | Oct. 24, 1941 |